United States Patent [19]

Fritzsche

[11] Patent Number: 4,816,711

[45] Date of Patent: Mar. 28, 1989

[54] LANCED STRIP AND EDGEWISE WOUND CORE

[75] Inventor: Harold L. Fritzsche, Fort Wayne, Ind.

[73] Assignee: General Electrical Company, Fort Wayne, Ind.

[21] Appl. No.: 79,379

[22] Filed: Jul. 30, 1987

Related U.S. Application Data

[60] Division of Ser. No. 782,486, Oct. 1, 1985, Pat. No. 4,688,413, which is a continuation-in-part of Ser. No. 660,211, Oct. 12, 1984, Pat. No. 4,613,780.

[51] Int. Cl.[4] .............................................. H02K 1/00
[52] U.S. Cl. ..................................... 310/216; 310/42; 310/259; 310/269
[58] Field of Search ............... 310/216, 217, 218, 254, 310/259, 261, 264, 265, 257, 269, 42; 29/596, 605, 609

[56] References Cited

U.S. PATENT DOCUMENTS

| 1,920,354 | 8/1933  | Carpenter  | 171/252 |
| 2,908,965 | 10/1959 | Platt      | 29/155.5 |
| 3,062,267 | 11/1962 | Hart et al. | |
| 3,095,774 | 7/1963  | Hart .     | |
| 3,152,629 | 10/1964 | Rediger .  | |
| 3,206,964 | 9/1965  | Hart et al. | 72/142 |
| 3,320,451 | 5/1967  | Wiley      | 310/216 |
| 3,577,851 | 5/1971  | Detheridge | 310/216 |
| 3,708,706 | 1/1973  | Akiyama    | 310/216 |
| 3,842,493 | 10/1974 | Ohuchi et al. | 29/596 |
| 3,886,256 | 5/1975  | Ohuchi     | 310/216 |
| 4,116,033 | 9/1978  | Iwaki et al. | 72/142 |
| 4,613,780 | 9/1986  | Fritzsche  | 310/216 |

FOREIGN PATENT DOCUMENTS

| 0851655 | 8/1952  | Fed. Rep. of Germany | 310/216 UX |
| 0111603 | 9/1979  | Japan | 310/216 |
| WO86/02501 | 10/1985 | PCT Int'l Appl. . | |
| 1096730 | 6/1984 | U.S.S.R. | 310/259 |

Primary Examiner—R. Skudy
Attorney, Agent, or Firm—Ralph E. Krisher, Jr.

[57] ABSTRACT

A lanced strip of generally thin ferromagnetic material adapted to be edgewise wound into a core for a salient pole dynamoelectric machine. A continuous yoke section of the lanced strip extends generally lengthwise thereof and includes a pair of generally opposite edges, and a set of spaced apart notches in one of the opposite edges with each notch having an arcuate edge therein, respectively. A set of spaced apart teeth are integral with the other of the opposite edges and extend generally laterally from the yoke section, and the teeth includes a set of free end sections each having another arcuate edge defining at least a part thereof and with respective ones of the first named and another arcuate edges having a common centerpoint, respectively.

A core for a salient pole dynamoelectric machine is also disclosed.

32 Claims, 5 Drawing Sheets

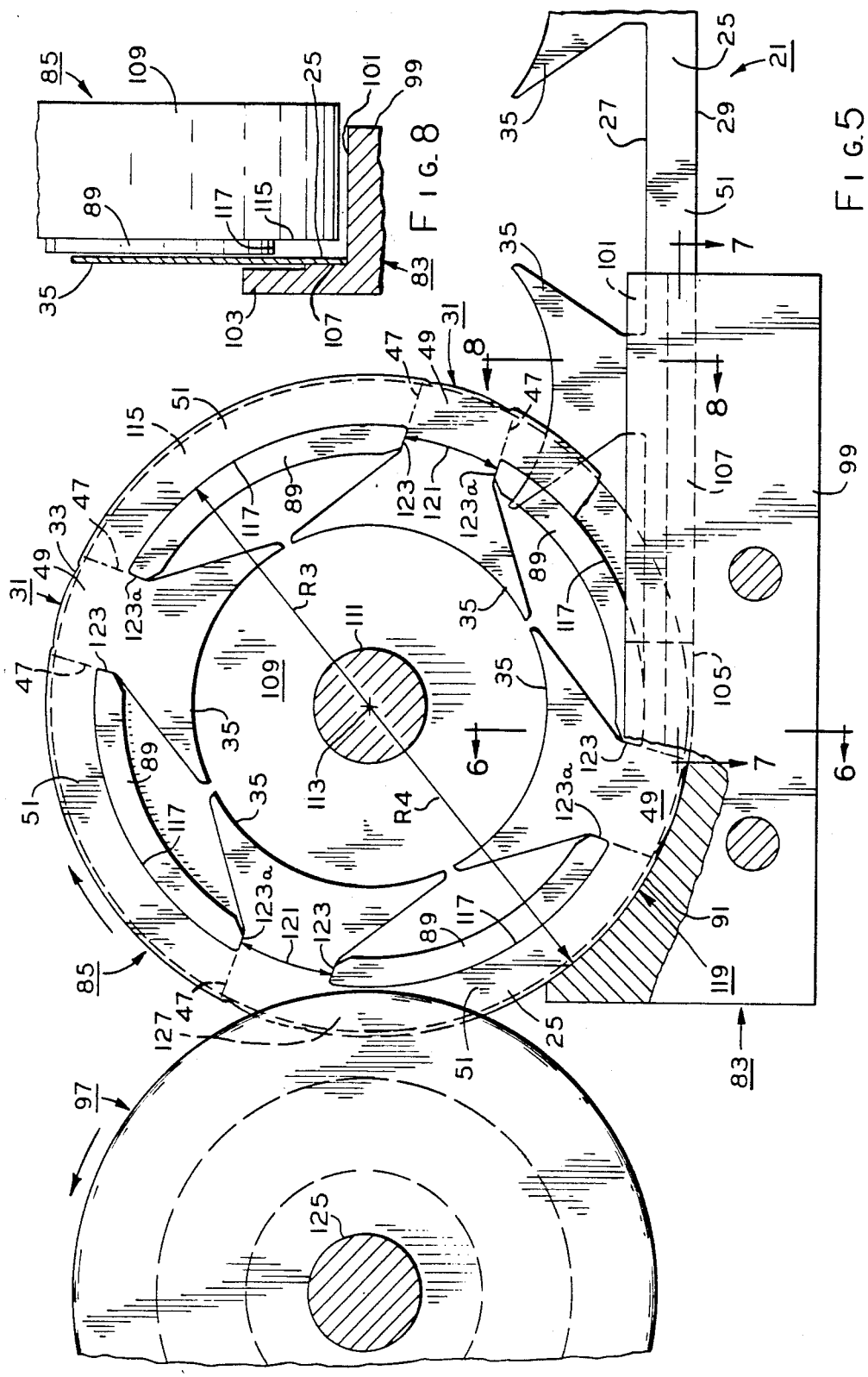

LANCED STRIP AND EDGEWISE WOUND CORE

CROSS-REFERENCE TO RELATED APPLICATIONS

This application is a division of parent application Ser. No. 782,486 filed Oct. 1, 1985 (now U.S. Pat. No. 4,688,413 issued Aug. 25, 1987) which is a continuation-in-part of the commonly assigned U.S. patent application Ser. No. 660,211 filed Oct. 12, 1984, (now U.S. Pat. No. 4,613,780 issued Sept. 23, 1986) and such continuation-in-part application and parent application are each incorporated herein by reference. This application is also related to the commonly assigned U.S. patent applications Ser. No. 660,101 filed Oct. 12, 1984, Ser. No. 660,116 filed Oct. 12, 1984 (now U.S. Pat. No. 4,643,012 issued Feb. 17, 1987) and Ser. No. 680,762 filed Dec. 12, 1984 (now U.S. Pat. No. 4,622,835 issued Nov. 18, 1986) which are also incorporated by reference herein.

FIELD OF THE INVENTION

This invention relates in general to dynamoelectric machines and in particular to a lanced stip adapted to be edgewise wound into a core for a salient pole dynamoelectric machine and an edgewise wound core for a salient pole dynamoelectric machine.

BACKGROUND OF THE INVENTION

In the past various different apparatus and methods have been utilized for effecting the edgewise deformation of a continuous lanced strip of generally thin ferromagnetic material into a plurality of generally helical convolutions thereof and accumulating such helical convolutions into a generally annular stack thereof so as to form an edgewise wound core for a dynamoelectric machine. Further, at least some of the aforementioned past apparatus and methods have been utilized to edgewise wind non-salient or distributed field cores of the usual type having teeth extending radially inwardly from a circumferential yoke section and also of the inside-out type with the teeth extending radially outwardly from the yoke section. Of course, the distributed field edgewise wound core has a relatively large number of teeth per helical convolution of the continuous lanced strip, such as for instance twenty-four teeth or more per helical convolutions, and such teeth are relatively narrow in width between the tips thereof and the yoke section.

Others of the aforementioned past apparatus and methods have been utilized to edgewise wind salient pole cores of the inside-out type with the salient pole pieces thereof extending radially outwardly from the yoke section. In comparison with the teeth of the distributed field edgewise wound core, the salient pole pieces of the salient pole edgewise wound core are appreciably fewer in number, such as for instance two, four, six or eight pole pieces per helical convolution, and the width or arcuate length of the salient pole pieces between the tips thereof and the yoke section may be appreciably greater than that of the teeth of the distributed field edgewise wound core.

It is believed, however, that some difficulties or problems may have been encountered in the past in attempting to edgewise wind a salient pole core from a continuous lanced strip of generally thin ferromagnetic material with the salient pole pieces of such salient pole core extending radially inwardly from a circumferential yoke section thereof. For instance, the bore defining free end edge on each salient pole piece of a four pole salient pole edgewise wound core may extend through an arc of up to at least about eighty-seven degrees about the bore of such core. Due to the above discussed relatively large width of the free end edge or tip of each salient pole piece, it is believed that interfering engagement of such salient pole piece tips on the continuous lanced strip with parts of the edgewise winding apparatus may have been encountered resulting in the aforementioned problem in past attempts to edgewise wind a salient pole core with the salient pole pieces extending radially inwardly from the circumferential yoke section. Another problem which may have been encountered in past attempts to edgewise wind a salient pole core is believed to be that such cores may not have had a generally uniform circumferential surface about the yoke section thereof.

SUMMARY OF THE INVENTION

Among the several objects of the present invention may be noted the provision of an improved lanced strip of generally thin ferromagnetic material adapted to be edgewise wound into a core for a salient pole dynamoelectric machine and an improved edgewise wound core for a salient pole dynamoelectric machine which overcome, at least in part, the problems or difficulties discussed above, as well as others, with respect to the prior art; the provision of such improved core, in which only preselected spaced apart segments in the yoke section of the lanced strip are generally edgewise or arcuately deformed to effect the edgewise deformation of the lanced strip into a plurality of generally helical convolutions thereof; the provision of such improved core, in which other segments in the yoke section of the lanced strip integrally interposed between the deformed segments remain undeformed; the provision of such improved core in which a set of spaced apart salient pole pieces on the lanced strip and integral with the undeformed segments in the yoke section are also undeformed; the provision of such improved lance strip in which respective ones of a free end edge on the salient pole pieces of the lanced strip and a base edge in a set of notches in the yoke section of the lanced strip have a common centerpoint, respectively; and the provision of such improved lanced strip in which the length of such notches is no greater than the width of a root section of the salient pole pieces extending lengthwise of the lanced strip at least adjacent the yoke section thereof, respectively. These as well as other objects and advantageous features of the present invention will be in part apparent and in part pointed out hereinafter.

In general and in one form of the invention, a lanced strip adapted to be edgewise wound into a core for a dynamoelectric machine has a continuous yoke section extending generally lengthwise thereof. The yoke section includes a pair of generally opposite edges and a set of spaced apart notches in one of the opposite edges with each notch having an arcuate edge therein, respectively. A set of spaced apart salient pole teeth are integral with the other of the opposite edges and extend generally laterally from the yoke section generally opposite the notches therein and the salient pole teeth include a set of free end sections each having another arcuate edge defining at least a part thereof and with respective ones of the first named and another arcuate edges having a common centerpoint, respectively.

Still further in general, an edgewise wound core in one form of the invention for a dynamoelectric machine comprises a continuous lanced strip of generally thin ferromagnetic material generally edgewise and helically wound into the core. A set of deformed segments and a set of undeformed segments are integrally interposed between each other in the continuous lanced strip and arranged in pluralities of generally axially extending row formations thereof across the core, and the row formations of the deformed and undeformed segments define a generally circumferential yoke section of the core, respectively. A set of undeformed salient pole teeth on the continuous lanced strip are integral with the undeformed segments and arranged about a plurality of preselected pitch axes in a plurality of row formations across the core so as to define in part a generally axial bore therein, respectively.

BRIEF DESCRIPTION OF THE DRAWINGS

FIG. 5 is a partial sectional view taken along line 5—5 in FIG. 4;

FIGS. 6, 7 and 8 are partial sectional views taken along lines 6—6, 7—7 and 8—8 in FIG. 5, respectively;

Corresponding reference characters indicate corresponding parts throughout the several views of the drawings.

The exemplifications set out herein illustrate the preferred embodiments of the invention in one form thereof, and such exemplifications are not to be construed as limiting either the scope of the invention or the scope of the disclosure in any manner.

DETAILED DESCRIPTION OF THE PREFERRED EMBODIMENTS

Figure 1:
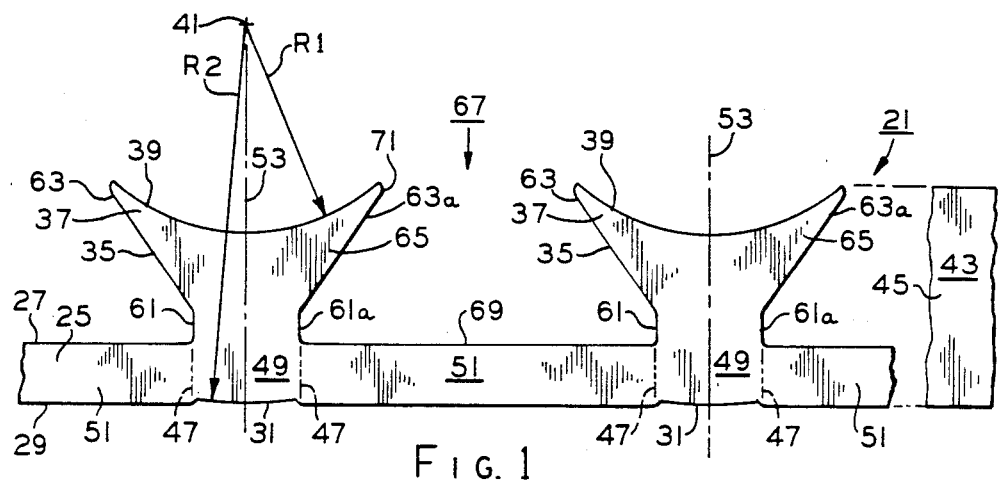
FIG. 1 is a front elevational view showing a part of a lanced strip in one form of the invention formed from strip stock of a generally thin ferromagnetic material.
Figure 2:
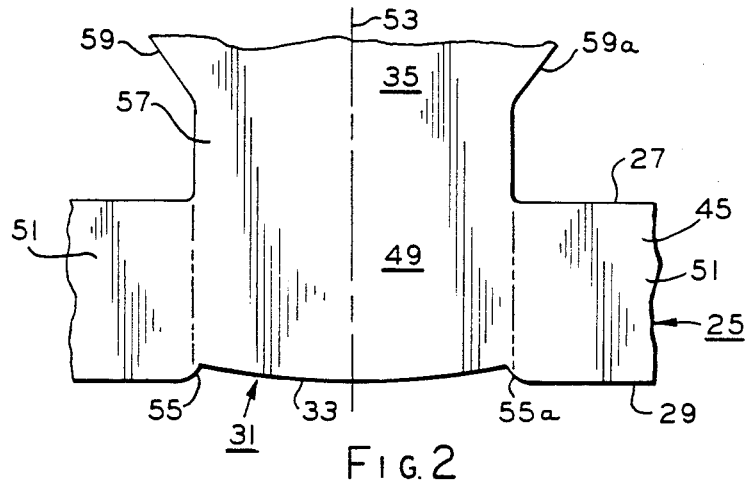
FIG. 2 is an enlarged partial front elevational view of the lanced strip of FIG. 1.
Figure 10:
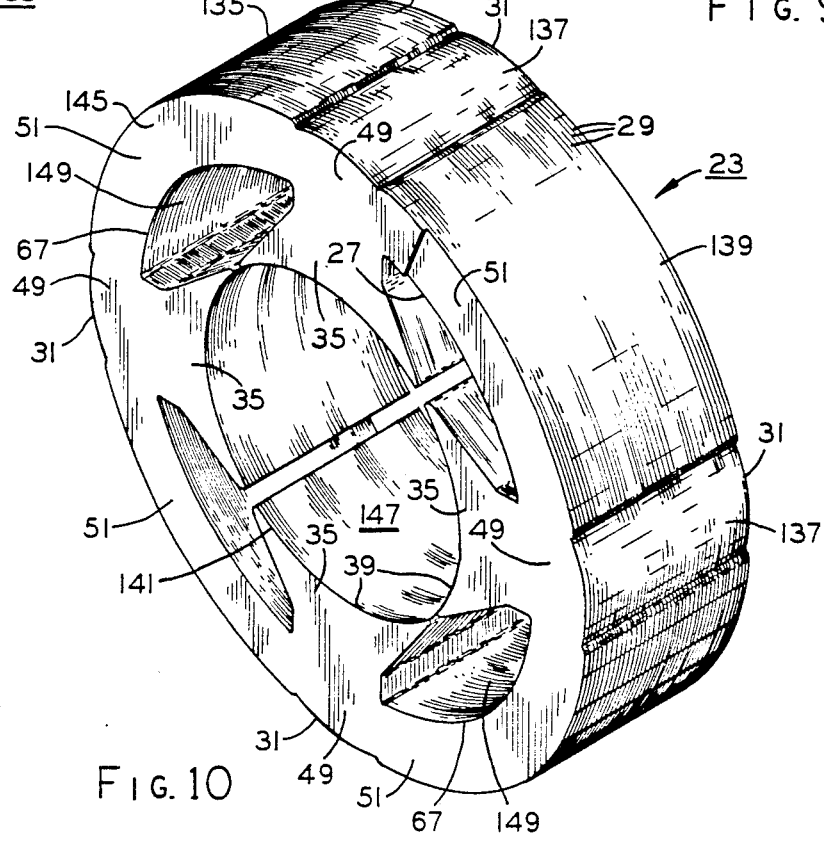
FIG. 10 is a perspective view showing the edgewise wound salient pole core in one form of the invention as formed by the apparatus of FIG. 3.

With reference now to the drawings in general there is illustrated in one form of the invention a continuous lanced strip 21 of generally thin ferromagnetic material adapted to be edgewise wound salient pole into a salient pole core 23 for a salient pole dynamoelectric machine (FIGS. 1, 2 and 10). Lanced strip 21 has a continuous yoke section 25 extending generally lengthwise thereof, and the yoke section includes a pair of opposite edges 27, 29 and a set of spaced apart notches 31 in opposite edge 29 with each notch having an arcuate or base edge 33 therein, respectively (FIGS. 1 and 2). A set of spaced apart salient pole pieces or teeth 35 are integral with opposite edge 27 extending generally laterally from yoke section 25 generally opposite notches 31 therein, and the salient pole teeth include a set of free end sections 37 each having another arcuate edge 39 defining at least a part thereof and with respective ones of base edges 33 and arcuate edges 39 having a common centerpoint 41, respectively (FIG. 1).

More particularly and with specific reference to FIGS. 1 and 2, lanced strip 21 may balanced or otherwise formed by suitable means well known to the art, such as progressive die sets or the like for instance, from a strip stock 43 of generally thin ferromagnetic material having the desired electrical characteristics and the physical properties desirable to enhance edgewise winding of the lanced strip, as discussed in greater detail hereinafter. Strip stock 43 has a pair of opposite faces 45, 45a (only face 45 being shown in FIGS. 1 and 2) which, of course, bound yoke section 25 and salient pole teeth 35 of lanced strip 21.

Dotted lines 47 indicate the integral interposition or interconnection of a pair of sets of segments 49, 51 provided in yoke section 25 so as to extend generally lengthwise thereof between inner and outer opposite edges 27, 29 on the yoke section, and it may be noted that segments 49 define integral junctures between adjacent ones of segments 51 and salient pole teeth 35, respectively. Salient pole teeth 35 span or are aligned generally about a set of preselected pitch axes 53 therefor which are predeterminately spaced apart from each other generally lengthwise of lanced strip 21, and it may be noted that notches 31 and segments 49 in yoke section 25 also span or are aligned generally about the pitch axes, respectively. Scalloped notches 31 in opposite edge 29 on yoke section 25 are each provided with a pair of opposed side edges or sidewalls 55, 55a with arcuate base edge or base wall 33 being interposed therebetween. It may be noted that the lengths of notches 31 between opposed side edges 55, 55a thereof are not greater than the preselected width of root sections 57 on salient pole teeth 35, and it may also be noted that the apexes of base edges 33 of the notches are arranged to be at least partially coextensive with outer opposite edge 29 on yoke section 25, as discussed in greater detail hereinafter.

Salient pole teeth 35 each have a pair of opposite side edges 59, 59a, and the opposite side edges include first opposite side edge portions 61, 61a and second opposite side edge portions 63, 63a, respectively. First opposite side edge portions 61, 61a intersect with opposite edge 27 on yoke section 25 at least generally at the intersections of segments 49, 51 therein, so denoted by dotted lines 47; therefore, root sections 57 of salient pole teeth 35 and the preselected width of the root sections are defined between the first opposite side edge portions, and the root sections are integrally formed with segments 49 generally at inner opposite edge 27 on yoke section 25, respectively. Second opposite side edge portions 63, 63a intersect with first opposite side edge portions 61, 61a and extend generally divergently therefrom to also intersect with arcuate edge 39, such as a free end edge or tooth tip, provided on each salient pole tooth 35; therefore, each salient pole tooth has its free end section 37 integral with root sections 57 and bounded by the second opposite side edge portions and the arcuate free end edge, respectively. Although previously mentioned, it may be further noted that respective ones of free end edges 39 on salient pole teeth 35 and base edges 33 in notches 31 have common centerpoint 41, as illustrated by radius arrows R1, R2, and it may be further noted that centerpoints 41 are located on pitch axes 53, respectively. Additionally, it may also be noted that the width of free end sections 37 of salient pole teeth 35 generally at free end edges 39 thereof is substantially greater than the width of root sections 57 of the salient pole teeth. While the configuration of salient pole teeth 35 is set out hereinabove for purposes of disclosure, it is contemplated that other salient pole teeth having various different configurations may be utilized on lanced strip 21 within the scope of the invention so as to meet at least some of the objects thereof.

A set of slots 67, such as winding receiving slots or the like for instance, are provided through lanced strip 21 at least adjacent segments 51 in yoke section 25 and between adjacent ones of salient pole teeth 35. Each of slots 67 have a closed end or closed end portion 69 communicating with an open end or open end portion 71 thereof. Closed end portions 69 of slots 67 are defined at least adjacent inner opposite edge 27 on yoke section 25 generally between the intersection therewith of opposed ones of opposite side edges 59, 59a on adjacent ones of salient pole teeth 35, respectively. To complete the description of lanced strip 21, open end portions 71 of slots 67 are arranged to extend generally between the intersections of free end edges 39 on adjacent ones of salient pole teeth 35 with opposed ones of opposite side edges 59, 59a thereon, respectively.

Figure 3:
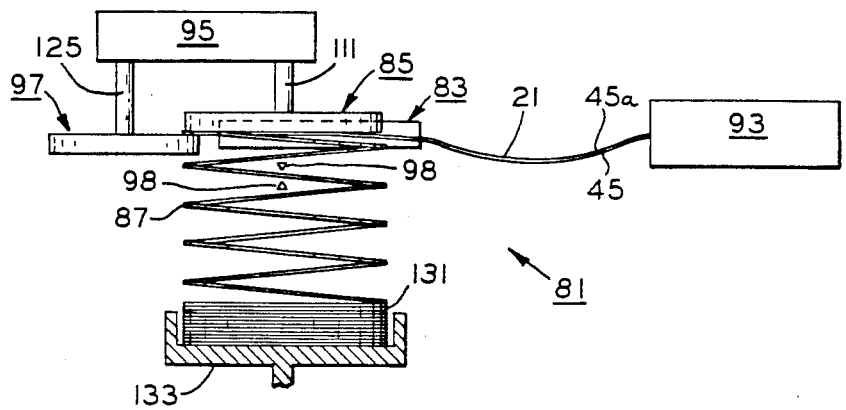
FIG. 3 is a schematic view showing apparatus for continuously forming edgewise wound salient pole cores for a salient pole dynamoelectric machine from the lanced strip of FIG. 1 and illustrating principles which may be practiced in a method of operating such apparatus as well as principles which may be practiced in a method of forming edgewise wound salient pole cores.
Figure 4:
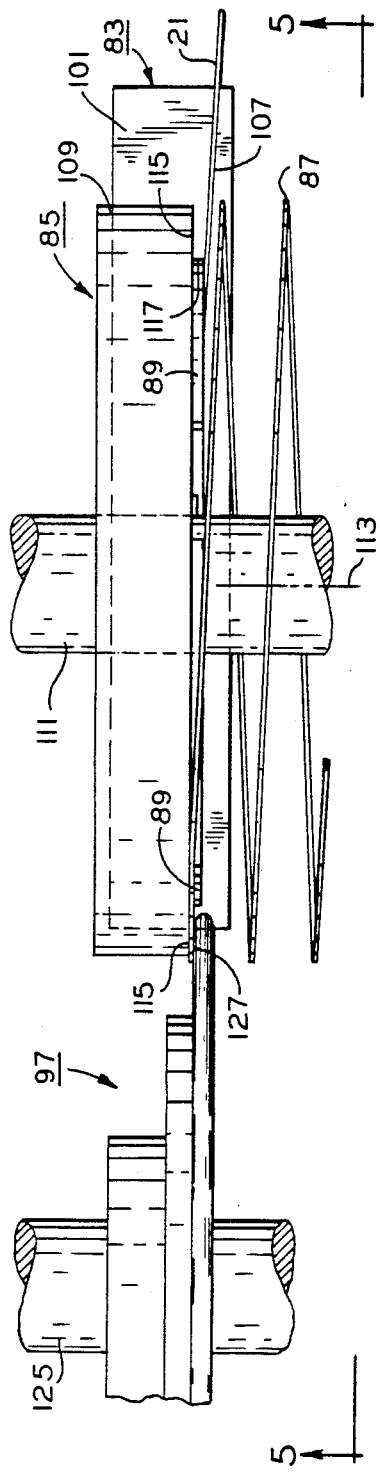
FIG. 4 is a side elevational view showing parts of the apparatus of FIG. 3.

With reference again to the drawings in general and recapitulating at least in part with respect to the foregoing, there is illustrated generally at 81 apparatus for continuously forming edgewise wound salient pole cores 23 from continuous lanced strip 21 (FIGS. 1-12). Apparatus 81 has a die or die means 83 and rotatable or rotation means, such as a rotatable arbor or mandrel 85 or the like for instance, and the die and rotatable mandrel are operable generally for effecting edgewise or flatwise deformation of lanced strip 21 into a plurality of helical convolutions 87 thereof upon the continuous passage at least yoke section 25 of the lanced strip between the die and the rotatable mandrel (FIGS. 3-9). Rotatable mandrel 85 includes a set of generally arcuate means, such as arcuate lands or projections 89 or the like for instance, conjointly rotatable therewith for successively constraining at least parts of inner opposite edge 27 on yoke section 25 between successive salient pole teeth 35 on lanced strip 21 (FIGS. 1, 4 and 5). Die 83 includes means, such as an arcuate surface or die surface 91 or the like for instance, for constraining only spaced parts of outer opposite edge 29 on yoke section 25 of lanced strip 21 which are located generally opposite the at least parts of the inner opposite edge thereon successively constrained by projections 89, respectively (FIGS. 1, 4 and 5).

More particularly and with specific reference to FIG. 3, apparatus 81 is provided with a source, as indicated schematically at 93, for lanced strip 21, and as well known to the art, such source may comprise a multiple die set for forming the lanced strip from strip stock 43; however, it is also contemplated that such source may comprise a reel or the like of the lanced strip, as also well known to the art. Driving means, as indicated schematically at 95, is operable generally for effecting the conjoint rotation of rotatable mandrel 85 and a rotatable disc, such as a presser or pinch wheel 97 or the like for instance, generally in opposite directions, as illustrated by directional arrows in FIG. 5, and the rotatable mandrel and disc respectively define means for gripping engagement with at least yoke section 25 of lanced strip 21 to effect the continuous passage thereof between die 83 and arcuate projections 89 on rotatable mandrel 85, as discussed in greater detail hereinafter. Means, such as cutters 98 or the like for instance, are operable generally for severing the lanced strip, as discussed hereinafter. In the event a more detailed discussion is required with respect to die 83, rotatable mandrel 85, source 93 or lanced strip 21, driving means 95, cutters 98 or rotatable disc 97, reference may be had to the aforementioned U.S. Pat. No. 4,613,780.

Figure 7:
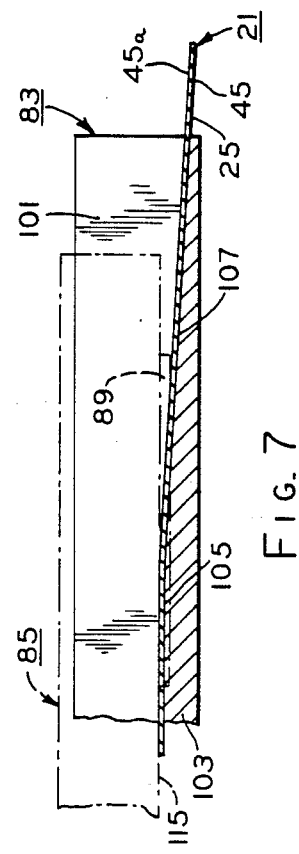
Figure 6:
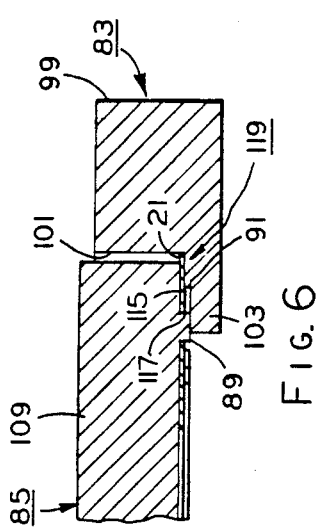

Die 83, which may be referred to as a bending guide or deforming means, comprises a generally elongate block 99 of suitable die material, such as a stainless steel or the like for instance, and a recess 101 in one side of the block provides a flange or guide 103 thereon for generally flatwise receiving lanced strip 21 thereon, as best seen in FIGS. 5 and 6. Arcuate or bending surface 91 of die 83 is provided in recess 101 at least generally adjacent one end of die block 99, such as an exit end thereof for lanced strip 21, and the arcuate die surface is arranged generally adjacent and perpendicular to flange 103 on the die block. A generally straight or guide surface 105 in recess 101 of die block 99 blends with arcuate die surface 91 and extends therefrom through the other end of the die block, such as an entry end thereof for lanced strip 21. At the entry end of die block 99, it may be noted that flange 103 is provided with a slightly beveled or angular surface 107 thereon of a preselected length and against which at least yoke section 25 of lanced strip 21 is generally flatwise received to effect momentary deflection or canting of salient pole teeth 35 on the lanced strip, as best seen in FIGS. 7 and 8 and as discussed in greater detail hereinafter. Albeit not shown herein for purposes of drawing simplification and brevity of disclosure, die block 99 may be resiliently urged by suitable means toward rotatable mandrel 85.

Rotatable mandrel 85 has a generally cylindric head 109 mounted to a spindle or shaft 111 which is rotatably driven by driving means 95 therefor, and the head and shaft are rotatable about a preselected axis 113 therefor which defines a winding axis for apparatus 81, as best seen in FIGS. 3-5. Head 109 is in part disposed in recess 101 of die 83, and a lower, generally annular, flat circumferential surface 115 is provided on the head so as to be disposed in part in spaced apart overlaying relation with flange 103 of die 83 at least generally at arcuate die surface 91 on the die. Arcuate projections 89 are arranged in an interrupted generally circular pattern thereof on head 109 depending therefrom adjacent circumferential surface 115, respectively, as best seen in FIGS. 3-6. A set of arcuate or strip engagement surfaces 117 of a preselected arcuate length are provided on projections 89 intersecting with circumferential surface 115 of head 109, and the projection arcuate surfaces are predeterminately arranged so as to extend generally in opposed radial spaced apart relation with arcuate die surface 91 in recess 101 of die 83 upon the aforementioned rotation of rotatable mandrel relative to the die.

In this vien, projection arcuate surfaces 117 are predeterminatedly arranged in equidistant radially spaced relation about preselected winding axis 113, as indicated by radius arrow R3 in FIG. 5, and the preselected winding axis defines a common centerpoint for both the projection arcuate surfaces and arcuate die surface 91, as illustrated by a radius arrow R4 for the arcuate die surface; therefore, the projection arcuate surfaces and the arcuate die surfaces are predeterminately radially spaced apart when in facing relation with each other. Thus, it may be noted that the aforementioned spaced apart relation of projection arcuate surfaces 117 and arcuate die surface 91 and the spaced overlaying relation of circumferential surface 115 on head 109 with flange 103 in recess 101 of die block 99 generally at the arcuate die surface thereof defines a preselected edgewise deformation passage, zone or path 119 through apparatus 81 between rotatable mandrel 85 and die 83 for the continuous passage therethrough of at least yoke section 25 of lanced strip 21, as discussed in greater detail hereinafter. Of course, the aforementioned predetermined radial spaced relation between projection arcuate surfaces 117 and arcuate die surface 91 is generally dictated by the width between opposite edges 27, 29 on yoke section 25 of lanced strip 21, and the overlaying spaced relation between circumferential surface 115 of head 109 and flange 103 in recess 101 of die block 99 is generally dictated by the thickness of the lanced strip between opposite faces 45a thereof; however, while lanced strip 21 is illustrated herein for purposes of disclosure, it is contemplated that different lanced strips having various different thicknesses and yoke sections with various different widths may be utilized in one form of the invention so as to meet at least some of the objects thereof.

A set of spaces or gaps 121 having a preselected arcuate length or width are provided between adjacent opposed ones of a pair of opposite ends or end portions 123, 123a on each of projections 89, and the opposite end portions of the projections define the aforementioned preselected arcuate lengths thereof, respectively. Gaps 121 are arranged to receive root sections 57 of salient pole teeth 35 on yoke section 25 of lanced strip 21 during the continuous passage thereof through preselected edgewise deformation path 119 of apparatus 81, as discussed in greater detail hereinafter; therefore, it may be noted that the preselected widths of the gaps are predeterminately greater than the preselected widths of the root sections of the salient pole teeth, respectively. As illustrated herein for purposes of disclosure, four projections 89 and four gaps 121 are shown with the projections extending through arcs of generally about seventy degrees (70°) and the gaps extending through arcs of generally about twenty degrees (20°); however, it is comtemplated that either more or fewer projections and gaps having various different arcuate lengths may be utilized within the scope of the invention so as to meet at least some of the objects thereof depending, of course, on the number of salient poles of the core being edgewise wound.

Rotatable disc 97 is mounted on a spindle or shaft 125 which is rotatably driven by driving means 95 conjointly with shaft 111 for head 109 of rotatable mandrel 85; therefore, the rotatable disc and mandrel are conjointly rotatable by the driving means, as previously mentioned. To complete the description of apparatus 81, disc 97 is provided with a generally flat, annular circumferential surface 127 disposed in part in opposed or overlaying relation with circumferential surface 115 on head 109 of rotatable mandrel 85, and circumferential surfaces 115, 127 are arranged in gripping engagement with opposite faces 45, 45a of lanced strip 21 on yoke section 25 thereof to draw or effect the continuous passage of at least the yoke section of the lanced strip through preselected edgewise deformation path 119 of the apparatus in response to the conjoint rotation of the rotatable disc and mandrel. The gripping engagement of circumferential surfaces 115, 127 of mandrel 85 and disc 97 with yoke section 25 of lanced strip 21 may be referred to as a pressing or gripping zone. Albeit not shown for purposes of drawing simplification and brevity of disclosure, either rotatable mandrel 85 or rotatable disc 97 may be urged by suitable resilient means toward the other thereof to effect or maintain a desired force of the gripping engagement between mandrel circumferential surface 115 and disc circumferential surface 127 with yoke section of lanced strip 21.

In the operation of apparatus 81, assume that the apparatus has been initially jogged or intermittently operated in a manner well known to the art thereby to place lanced strip 21 and component parts of the apparatus generally in the positions thereof illustrated in FIG. 5, and if a more detailed discussion of the aforementioned initial jogging of the apparatus to initially associate the lanced strip therewith is desired, reference may be had to be aforementioned U.S. Pat. No. 4,613,780. As may be best seen in FIGS. 3-6, lanced strip 21 is continuously fed or passed from source 93 thereof into die 83, and yoke section 25 of the lanced strip is generally flatwise engaged with flange 103 on the die block 99, i.e., opposite face 45a of the lanced strip on the yoke section thereof is arranged in facing relation or sliding engagement with the die flange, while outer opposite edge 29 on the yoke section is disposed in guiding or sliding engagement with guide surface 105 in the die block. Thus, in response to the clockwise rotation of mandrel 85 by driving means 95, as indicated by the rotational arrow therefor in FIG. 5, it may be noted that arcuate surfaces 117 on projections 89 of the mandrel are successively and independently rotated into constraining or edgewise deforming engagement with only inner opposite edges 27 on yoke section 25 of lanced strip 21 between adjacent or successive ones of salient pole teeth 35 thereon. As each arcuate surface 117 on projections 89 of mandrel 85 are rotated thereby through preselected edgewise deformation path or bending zone 119 between the mandrel and die 83 so as to be disposed in opposed facing relation with arcuate die surface 91, it may also be noted that only successive or spaced apart parts of outer opposite edge 29 on yoke section 25 of lanced strip 21 are disposed in constraining or edgewise deforming engagement with the arcuate die surface, and such spaced apart parts of the outer opposite edge are located on the yoke section generally opposite the parts of inner opposite edges 27 thereof between adjacent salient pole teeth 35 so as to be in constraining or deformation engagement with arcuate surfaces 117 on mandrel projections 89, respectively. In other words, only segments 51 in yoke section 25 of lanced strip 21 are edgewise or arcuately deformed during the passage of the lanced strip through preselected edgewise deformation path 119 between die 83 and rotatable mandrel 85 in response to the constraining engagement of inner and outer opposite edges 27, 29 on only segments 51 in the yoke section between successive projection arcuate surfaces 117 and arcuate die surface 91 when such projection arcuate surfaces are in opposed facing relation with the arcuate die surface, respectively.

During the above discussed continuous passage of yoke section 25 on lanced strip 21 through bending zone 119 between die 83 and rotatable mandrel 85 to effect the successive edgewise deformation of only segments 51 in the yoke section, root sections 57 on adjacent or successive ones of salient pole teeth 35 are received in successive ones of gaps 121 between projections 84 on the rotatable mandrel in response to the rotation thereof, as best seen in FIG. 7. It may be noted that salient pole teeth 35 on lanced strip 21, segments 49 in yoke section 25 of the lanced strip, and parts of outer opposite edge 29 on the yoke section bounding segments 49 are unconstrained between free end edges 39 of teeth 35 and arcuate edges 33 of notches 31 and thereby left undeformed, i.e., maintained in their original lanced configuration or condition, in response to the passage of segments 49 in the yoke section of the lanced strip through bending zone 119 of apparatus 81 between die 83 and rotatable mandrel 85 thereof, respectively. Thus, as illustrated in FIG. 7, the parts of outer opposite edge 29 on yoke section 25 bounding segments 49 therein are unconstrained by arcuate die edge 91 being displaced therefrom, respectively.

As lanced strip 21 is passed from source 93 thereof into the entry end of die 83, as best seen in FIGS. 3, 5 and 7, yoke section 25 of the lanced strip and root sections 57 of salient pole teeth 35 pass over or slide upon beveled surface 107 on flange 103 of die block in general flatwise relation or sliding engagement therewith. Therefore, the instantaneous engagement of that portion of yoke section 25 and that root section 57 of a particular one of salient pole teeth 35 with beveled surface 107 on flange 103 of die block 99 is effective to cause a deflection or canting of such particular one salient pole tooth through a preselected angularity so as to obviate interfering engagement between a free end section 37 thereof and an end portion 123 of one of the projections 89 on rotatable mandrel 85 being rotated thereby toward the above discussed edgewise constraining engagement with one of segments 51 on the yoke section, respectively. In view of the above, it may be noted that salient pole teeth 35 on lanced strip 21 are predeterminately deflected from the path of projections 89 rotatable with mandrel 85 in order to obviate interfering engagement or abutment of free end sections 37 on the salient pole teeth with the projections on the rotatable mandrel. However, the free end section 37 of the particular deflected salient pole tooth 35 may engage or ride on a projection 89 as it is being rotated by rotatable mandrel toward bending zone 119 of apparatus 81 until a gap 121 between adjacent projections passes over the root section 57 of the particular deflected salient pole tooth in receiving relation therewith thereby to permit the particular deflected salient pole tooth to reassume its generally coplanar relation with yoke section 25 in lanced strip prior to the passage thereof through bending zone 119 in apparatus 81.

The previously discussed successive edgewise deformations of only segments 51 in yoke section 25 of lanced strip 21 while leaving segments 49 therein and salient pole teeth 35 undeformed during the passage of the lanced strip through bending zone 119 of apparatus 81 effects the edgewise deformation of the lanced strip into a plurality of generally helical convolutions 87 thereof, as best seen in FIGS. 3 and 4. Even though salient pole teeth 35 are undeformed, it may be noted that pitch axes 53 therefor are repositioned so as to extend generally radially with respect to helical convolutions 87 in response to the edgewise deformation of segments 57, respectively. Of course, the helical convolutions 87 of deformed lanced strip 21 passing from the exit end of die 83 is grippingly engaged between overlaying circumferential surfaces 115, 127 of rotatable mandrel 85 and rotatable disc 97, as best seen in FIGS. 4 and 5, and the gripping engagement of circumferential surfaces 115, 127 with yoke section 25 of such deformed helical convolution of the lanced strip is effective to draw or move the lanced strip from its source 93 through bending zone 119 of apparatus 81, as previously discussed.

Helical convolutions 87 of deformed lanced strip 21 passing from the exit end of die 83 are accumulated in a generally annular stack 131 thereof on a receiving means, such as a receiver or support 133 therefor, as best seen in FIG. 3. As helical convolutions 87 of deformed lanced strip 21 are accumulated in annular stack 131 therefor on receiver 133, yoke section 21 of the deformed lanced strip is disposed generally circumferentially about the annular stack, and the deformed parts of outer opposite edge 29 bounding deformed segments 51 in the yoke section and the undeformed parts of the outer opposite edge bounding undeformed segments 49 in the yoke section are arranged to form a generally circumferential surface 135 extending about the yoke section and generally axially across the annular stack. Further, during the aforementioned accumulation of helical convolutions 87 of deformed lanced strip 21 into annular stack 131, undeformed and deformed segments 49, 51 and salient pole teeth 35 are arranged or associated generally in pluralities of row formations 137, 139, 141 thereof extending generally axially across the annular stack with the salient pole teeth extending generally radially inwardly about their repositioned pitch axes 53 from the yoke section of the deformed lanced strip, respectively. At least generally as helical convolutions 87 of deformed lanced strip 21 accumulated in annular stock 131 thereof attain a preselected axial length or stack height for the annular stack, severing means or cutters 98 may be actuated in a manner well known to the art to sever one of the helical convolutions of the deformed strip. Albeit not shown for the sake of drawing simplification and brevity of disclosure, annular stack 131 may be removed from its receiver 133 subsequent to the operation of cutters 98 so that another annular stack of helical convolutions of the deformed strip may be accumulated on such receiver without interrupting the operation apparatus 81 to continuously form such helical convolutions of the deformed lanced strip. If a more detailed discussion of the constructions and/or operations of cutters 98 and receiver 133 is desired, reference may be had to the aforementioned U.S. Pat. No. 4,613,780.

Figure 11:
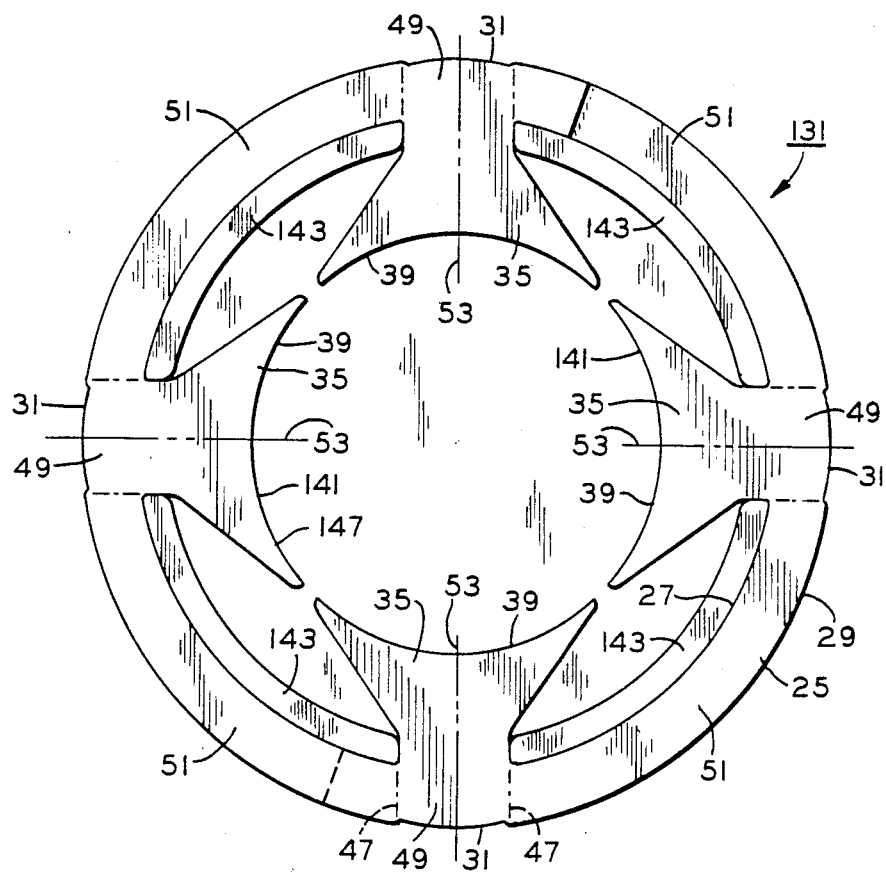
FIG. 11 is an end elevational view of the edgewise wound salient pole core of FIG. 10 and illustrating the axial alignment of the component parts of the edgewise wound salient pole core thereacross on an aligning fixture.

Upon removal of such helical convolution stack 131 from receiver 133 therefor, such stack is placed about or associated with an aligning arbor 143, as shown in part in FIG. 11, in a manner well known to the art, and helical convolutions 87 in such stack are easily adjusted or repositioned with respect to each other to effect the axial alignment of undeformed segments 49, deformed segments 51 and undeformed salient pole teeth 35 into the axial row formations 137, 139, 141 thereof between a pair of opposite end faces 145, 145a on such stack thereby to define an edgewise wound core 23. Upon the above discussed alignment of helical convolution stack 131 on aligning arbor 143, free end edges 39 on salient pole teeth 35 in the axial row formations 141 thereof define in part an axially extending bore 147 through core 23 between opposite end faces 145, 145a thereon, and slots 67 in deformed lanced strip 21 are also disposed in pluralities of axial row formations 149 thereof between the aligned salient pole teeth so as to intersect with the opposite end faces on the edgewise wound core thereby to define winding receiving slots in such core, respectively. As previously mentioned, pitch axes 53 for salient pole teeth 35 are repositioned so as to extend generally radially with respect to core 23. Further, it may also be noted that, notches 31 in the undeformed parts of outer opposite edge 29 bounding undeformed segments 49 are also arranged in pluralities of aligned axial row formations in circumferential surface 135 of core 23 between opposite end faces 145, 145a thereof, and the arcuate base edges 33 of the notches serve to blend the undeformed parts of outer opposite edge 29 with the deformed parts thereof on deformed segments 51, respectively.

Figure 9:
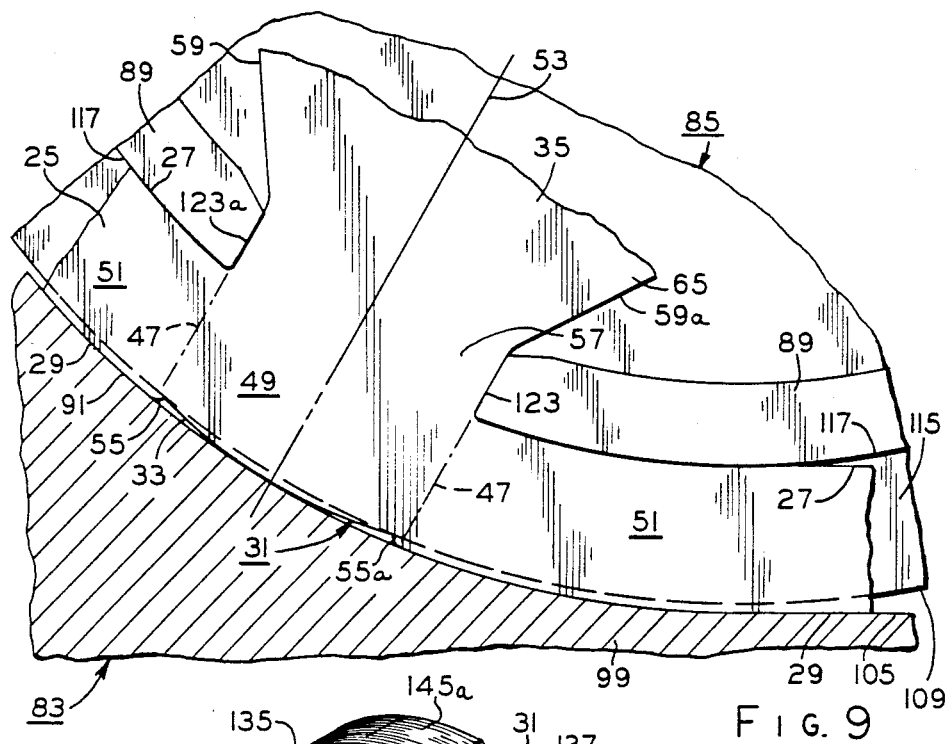
FIG. 9 is an enlarged elevational view taken from FIG. 5 but illustrating the unconstrained passage of an undeformed salient pole tooth and yoke segment associated therewith of the lanced strip between a mandrel and die for effecting edgewise deformation of the lanced strip.

With further reference to the drawings in general and again recapitulating at least in part with respect to the foregoing, there is illustrated a method of operating apparatus 81 for continuously forming edgewise wound salient pole cores 23 from continuous lanced strips 21 (FIGS. 1-12). In practicing this method, mandrel 85 is rotated relative to die 81 with continuous lanced strip 21 being passed therebetween (FIGS. 3-9). Arcuate projections 89 on mandrel 85 are successively engaged with at least parts of inner opposite edge 27 on yoke section 21 of the continuous lanced strip between adjacent ones of salient pole teeth 35, and thereby only parts of outer opposite edge 29 on the yoke section disposed generally opposite the parts of the inner opposite edge successively engaged by the projections are successively constrained in engagement with arcuate surface 91 on die 83 so as to effect edgewise deformation of the continuous lanced strip into helical convolutions 87 thereof in response to the rotation of the mandrel relative to the die, respectively (FIGS. 5, 6 and 9).

Figure 12:
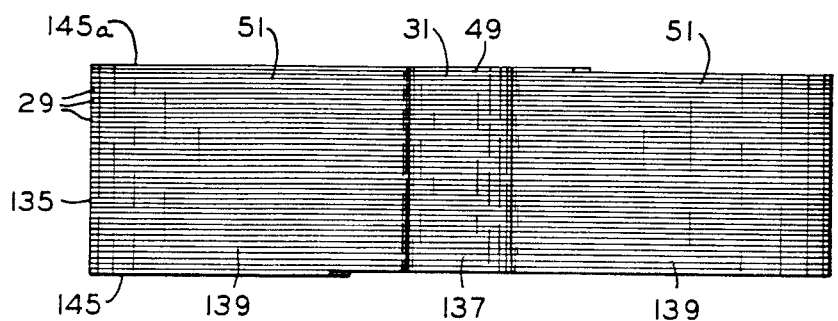
FIG. 12 is a side elevational view of the edgewise wound salient pole core of FIG. 11.

Also, edgewise wound salient pole core 23 in one form of the invention comprises continuous lanced strip 21 generally edgewise and helically wound into the core (FIGS. 10-12). Deformed segments 51 and undeformed segments 49 are integrally interposed between each other in continuous lanced strip 21 and arranged generally in pluralities of generally axially extending row formations 137, 139 across core 23, and the row formations of the deformed and undeformed segments define a generally circumferential yoke section 21 of the core, respectively (FIG. 9). Undeformed salient pole teeth 35 on continuous lanced strip 21 integral with undeformed segments 49 thereof are arranged about pitch axes 53 therefor in pluralities of row formations 141 thereof so as to define in part generally axial bore 147 therein, respectively (FIGS. 10 and 11).

Further, a method is illustrated from the foregoing for forming an edgewise wound salient pole core 23 (FIGS. 1-12). In practicing this method, successive segments 51 in yoke section 25 of lanced strip 21 are successively and independently edgewise constrained along at least a part thereof, and salient pole teeth 35 and segments 49 are left unconstrained (FIGS. 5 and 9). Only the at least parts of edgewise constrained segments 51 are successively and independently deformed, and the constrained salient pole teeth 35 and segments 49 are maintained in the original lanced configurations thereof (FIGS. 5, 10 and 11).

From the foregoing, it is now apparent that a novel lanced strip 21 and a novel edgewise wound core 23 have been presented meeting the objects set forth hereinabove, as well as others, and it is contemplated that changes as to the precise arrangements, shapes, connections and details of the constructions illustrated herein by way of example for purposes of disclosure may be made by those having ordinary skill in the art without departing from the spirit of the invention or the scope thereof which is defined by the claims which follow.

What I claim as new and desire to secure by Letters Patent of the United States is:

1. A lanced strip of generally thin ferromagnetic material adapted to be edgewise wound into a core for a salient pole dynamoelectric machine, the lanced strip comprising:

a continuous yoke section extending generally lengthwise of the lanced strip and including a pair of generally opposite edges, a set of spaced apart segments interposed between said opposite edges, a set of junctures integrally interconnected between said segments and interposed between said opposite edges, and a set of notches in said junctures extending through said lanced strip with each notch having a pair of generally opposed sidewalls intersecting one of said opposite edges and spaced apart generally lengthwise of the lanced strip thereby to define a preselected length of said each notch and also having a generally arcuate base wall interconnecting between said opposed sidewalls, respectively;

a plurality of salient pole pieces on the lanced strip extending generally laterally from said yoke section, said salient pole pieces and said notches being respectively aligned about a set of pitch axes predeterminately spaced apart generally lengthwise of the lanced strip, each salient pole piece including a pair of generally opposite side edges having a pair of first and second opposite side edge portions, said first opposite side edge portions intersecting the other of said opposite edges on said yoke section at least generally at the interconnection of a respective one of said junctures with respective ones of said segments adjacent thereto thereby to define a root section of said each salient pole piece integral with said respective one of said junctures and arranged generally opposite a respective one of said notches, the preselected length of said notches being no greater than the width of said root sections along the length of the lanced strip between said first opposite side edge portions, said second opposite said edge portions intersecting with said first opposite side edge portions and extending generally divergently with respect to each other from said first opposite side edge portions thereby to define in part a free end section on said each salient pole piece integral with said root section thereof and spaced from said respective one of said junctures, and a free end edge on said free end section extending at least in part generally arcuately between said second opposite side edge portions and intersecting therewith, respective ones of said at least arcuate part of said free end edge on said salient pole pieces and said arcuate base wall of said notches having common centerpoints, respectively; and a set of slots extending through the lanced strip adjacent said segments in said yoke section and between adjacent ones of said salient pole pieces, each of said slots including a closed end portion defined at least in part generally adjacent said other opposite edge on said yoke section generally between the intersections therewith of opposed ones of said first opposite side edge portions on said adjacent ones of said salient pole pieces, and an open end portion communicating with said closed end portion and at least in part extending generally between the intersections of said free end edges on said adjacent ones of said salient pole pieces with opposed ones of said second opposite side edge portions thereon, respectively.

2. A lanced strip of generally thin ferromagnetic material adapted to be edgewise wound into a core for a salient pole dynamoelectric machine, the lanced strip comprising:

a continuous yoke section extending generally lengthwise of the lanced strip, said yoke section including a pair of generally opposite edges, and a set of spaced apart notches extending through said yoke section with each notch having a pair of opposed sidewalls defining a preselected length thereof and intersecting one of said opposite edges of said yoke section and also having an arcuate base wall interposed between said opposed sidewalls; and a set of spaced apart salient pole pieces extending generally laterally from said yoke section and disposed generally opposite said notches therein, each salient pole piece including a pair of opposite side edges intersecting with the other of said opposite edges on said yoke section and extending at least in part generally divergently with respect to each other from said other opposite edge on said yoke section, the preselected length of said notches being no greater than the width of said salient pole pieces defined along the length of the lanced strip between said opposite side edges at least generally at the intersections thereof with said other opposite edge on said yoke section, a free end edge intersecting with said opposite side edges and spaced from said other opposite edge on said yoke section, and an arcuate portion on said free end edge extending at least in part between said opposite side edges and in opposite facing relation with a respective one of said arcuate base walls, each of said arcuate portions and said respective one of said arcuate base walls being defined about a common centerpoint.

3. A lanced strip as set forth in claim 2 wherein said notches and said salient pole pieces are aligned generally about a set of pitch axes predeterminately spaced part generally lengthwise of the lanced strip, respectively.

4. A lanced strip as set forth in claim 2 further comprising a set of slots extending therethrough between adjacent salient pole pieces, each of said slots including a closed end portion defined in part adjacent said other opposite edge on said yoke section between the intersections therewith of opposed ones of said opposite side edges on said adjacent salient pole pieces, and an open end portion disposed in part between the intersections of said opposed ones of said opposite side edges on said adjacent salient pole pieces with said free end edges thereof, respectively.

5. A lanced strip of generally thin ferromagnetic material adapted to be edgewise wound into a core for a salient pole dynamoelectric machine, the lanced strip comprising:

a continuous yoke section extending generally lengthwise of the lanced strip, said yoke section including a pair of generally opposite edges, and a set of spaced apart notches each having a pair of opposed sidewalls defining a preselected length thereof and intersecting one of said opposite edges and with an arcuate base wall between said opposed sidewalls, respectively; and a set of spaced apart salient pole pieces integrally interconnected with the other of said opposite edges on said yoke section so as to extend generally laterally therefrom and arranged generally opposite said notches, respectively, each salient pole piece including a free end section having a width extending generally lengthwise of the lanced strip and being substantially greater than another width on said each salient pole piece at least generally at the integral interconnection thereof with said other opposite edge on said yoke section and with the preselected length of said notches being no greater than the another width of said salient pole pieces, and an arcuate free end edge on said free end section having a centerpoint common with that of said base wall of a respective one of said notches opposite said each salient pole piece.

6. A lanced strip as set forth in claim 5 wherein said each salient pole piece includes a pair of opposite side edges intersecting with said other opposite edge on said yoke section and extending at least in part generally divergently therefrom, said free end edge being spaced from said other opposite edge on said yoke section and intersecting said opposite side edges to define therewith said free end section on said each salient pole piece, the first named width being defined between said opposite side edges at least generally at the intersections thereof with said free end edge and the another width being defined between said opposite side edges at least generally at the intersections thereof with said other opposite edge on said yoke section, respectively.

7. A lanced strip of generally thin ferromagnetic material adapted to be edgewise wound into a core for a salient pole dynamoelectric machine, the lanced strip comprising:

a continuous yoke section extending generally lengthwise of the lanced strip, said yoke section including a pair of generally opposite edges, and a set of spaced apart notches in one of said opposite edges with each notch having an arcuate edge therein, respectively; and a set of spaced apart salient pole pieces integral with the other of said opposite edges and extending generally laterally from said yoke section generally opposite said notches therein, said salient pole pieces including a set of free end sections each having another arcuate edge defining at least a part thereof and with respective ones of said first named and another arcuate edges having a common centerpoint, respectively.

8. A lanced strip as set forth in claim 7 wherein said notches include a pair of generally opposed side each interposed between said first named arcuate edge and said one opposite edge and defining a preselected length of said notches, respectively.

9. A lanced strip as set forth in claim 8 wherein said salient pole pieces further include a set of root sections integrally interposed between said free end sections and said other opposite edge with each root section having a preselected width extending generally lengthwise of said yoke section at least generally adjacent said other opposite edge thereof and with the preselected length of said notches being no greater than the preselected width of said root sections, respectively.

10. A lanced strip as set forth in claim 7 wherein said salient pole pieces and said notches span a set of pitch axes predeterminately spaced apart generally lengthwise of the lanced strip, respectively.

11. An edgewise wound core for a dynamoelectric machine comprising:
a continuous lanced strip of generally thin ferromagnetic material generally edgewise and helically wound into said core;
a pair of opposite end portions on said continuous lanced strip defining a pair of generally axially spaced apart opposite end faces of said core, respectively;
a set of generally arcuately deformed outer edges and a set of undeformed outer edges on said continuous lanced strip with said arcuately deformed outer edges interconnected between said undeformed outer edges, said arcuately deformed outer edges and said undeformed outer edges being arranged generally in row formations thereof between said opposite end faces of said core thereby to define a circumferential surface about said core, respectively;
a set of generally arcuately deformed inner edges on said continuous lanced strip generally opposite said arcuately deformed outer edges and arranged generally in row formations thereof between said opposite end faces of said core, respectively;
a set of undeformed salient pole teeth on said continuous lanced strip interconnected between said arcuately deformed inner edges and aligned about a set of preselected pitch axes therefor so as to extend generally radially inwardly from said arcuately deformed inner edges in row formation between said opposite end faces of said core, said undeformed outer edges also being aligned about the preselected pitch axes, and said undeformed salient pole teeth including a set of free end edges thereon defining at least in part a generally axial bore through said core between said opposite end faces thereof, respectively; and
a set of winding receiving slots disposed between adjacent ones of said undeformed salient pole teeth and extending generally in row formation thereof between said opposite end faces of said core, said slots including a set of open ends disposed generally between the free end edges of said adjacent ones of said undeformed salient pole teeth and communicating with said bore, and a set of closed ends generally defined by said arcuately deformed inner edges between said adjacent ones of said salient pole teeth, respectively.

12. The edgewise wound core as set forth in claim 11 wherein said undeformed outer edges includes a set of notches arranged in said lanced strip generally radially opposite said salient pole teeth, respectively, each notch including a pair of generally opposed sidewalls blending with adjacent ones of said arcuately deformed outer edges, and a generally arcuate base wall interposed between said opposed sidewalls, said base walls of said notches being aligned about the preselected pitch axes and spaced generally radially inwardly with respect to said arcuately deformed outer edges, respectively.

13. The edgewise wound core as set forth in claim 12 wherein said free end edges are generally arcuate, each free end edge and base wall aligned about a respective one of the preselected pitch axes having a common centerpoint located thereon.

14. The edgewise wound core as set forth in claim 12 said salient pole teeth further include a set of root sections intersecting with adjacent ones of said arcuately deformed inner edges, the lengths of said base walls between said opposed sidewalls being no greater than the widths of said root sections at least adjacent said adjacent ones of said arcuately deformed inner edges, respectively.

15. The edgewise wound core as set forth in claim 14 wherein said undeformed segments include a set of notches disposed generally opposite said undeformed salient pole teeth and arranged generally about the preselected pitch axes, respectively, and each notch having a generally arcuate base wall.

16. The edgewise wound core as set forth in claim 15 wherein each of said free end edges and said base walls are arranged about a respective one of the preselected pitch axes and have a common centerpoint thereon.

17. The edgewise wound core as set forth in claim 15 wherein said salient pole teeth further include a set of root sections adjacent said undeformed segments, respectively, each arcuate base wall having a length no greater than the width of each root section at least generally adjacent said undeformed segments.

18. An edgewise wound core for a dynamoelectric machine comprising:
a continuous lanced strip of generally thin ferromagnetic material edgewise and helically wound into said core;
a pair of opposite end portions on said continuous lanced strip defining a pair of generally axially spaced apart opposite end faces of said core, respectively;
a set of generally arcuately deformed segments in said continuous lanced strip and arranged generally in a plurality of row formations thereof between said opposite end faces, respectively;
a set of undeformed segments in said continuous lanced strip integrally interposed between said arcuately deformed segments and arranged generally in a plurality of row formations thereof between said opposite end faces, said row formations of said arcuately deformed segments and said undeformed segments defining a generally annular yoke section of said core, respectively; and
a set of undeformed salient pole teeth on said continuous lanced strip integral with said undeformed segments and arranged generally about a plurality of preselected pitch axes therefor so as to extend generally radially inwardly from said undeformed segments in a plurality of row formations between said opposite end faces, said undeformed salient pole teeth including a set of free end edges defining in part a generally axial bore through said core between said opposite end faces thereof, respectively.

19. An edgewise wound core for a dynamoelectric machine comprising:
a continuous lanced strip of generally thin ferromagnetic material generally edgewise and helically wound into said core;

a set of deformed segments and a set of undeformed segments integrally interposed between each other in said continuous lanced strip and arranged in pluralities of generally axially extending row formations thereof across said core, said row formations of said deformed and undeformed segments defining a generally circumferential yoke section of said core, respectively; and a set of undeformed salient pole teeth on said continuous lanced strip integral with said undeformed segments and arranged about a plurality of pitch axes in a plurality of row formations across said core so as to define in part a generally axial bore therein, respectively.

20. An edgewise wound core as set forth in claim 19 wherein said undeformed salient pole teeth include a set of free end edges defining in part said bore, respectively.

21. The edgewise wound core as set forth in claim 20 wherein said undeformed segments include a set of notches arranged about the preselected pitch axes generally opposite said salient pole teeth and having a set of free arcuate base walls disposed generally in opposite facing relation with said free end edges, respectively, each of said free arcuate base walls and said free end edges arranged about a respective one of the pitch axes having a common centerpoint.

22. The edgewise wound core as set forth in claim 21 wherein said common centerpoint is located on the respective one of the pitch axes.

23. An edgewise wound core as set forth in claim 19 further comprising a set of winding receiving slots arranged between adjacent ones of said undeformed salient pole teeth and extending generally in row formations thereof across said core, said slots including a set of open ends communicating with said bore, and a set of closed ends at least adjacent said deformed segments between said adjacent ones of said undeformed salient pole teeth, respectively.

24. A lanced strip of generally thin ferromagnetic material adapted to be edgewise wound into a core for a salient poly dynamoelectric machine, the lanced strip comprising:

a generally elongate yoke section;

a set of salient pole pieces extending generally laterally from said yoke section on a set of pitch axes predeterminately spaced apart along the yoke section and including a set of generally arcuate free end edges spanning the pitch axes, respectively; and a set of notches in said yoke section including a set of generally arcuate base walls spanning the pitch axes, respectively, each of said arcuate free end edges and said arcuate base walls spanning a respective one of the pitch axes having common centerpoints.

25. The lanced strip as set forth in claim 24 wherein said yoke section includes a pair of generally opposite edges, said pole pieces being integral with one of said opposite edges and said notches intersecting with the other of said opposite edges.

26. The lanced strip as set forth in claim 25 wherein each notch includes a pair of generally opposed sidewalls intersecting the other of said opposite edge, respectively, and with one of said arcuate base walls interposed between said opposed sidewalls.

27. The lanced strip as set forth in claim 25 wherein said base walls are spaced from said other opposite edge.

28. The lanced strip as set forth in claim 24 wherein the common centerpoints are located on the respective one of the pitch axes.

29. An edgewise wound salient pole core for a dynamoelectric machine comprising:

a continuous lanced strip of generally thin ferromagnetic material generally edgewise and helically wound to in part form a generally annular yoke section of the core having a circumferential surface thereabout and with said wound lanced strip having a pair of opposite end portions defining a pair of generally opposite end faces on said core intersecting with said circumferential surface, respectively;

a set of salient pole pieces on said wound lanced strip and arranged on a set of preselected pitch axes so as to extend generally radially inwardly in axial row formations from said yoke section between said opposite end faces, said salient pole pieces including a set of root sections adjacent said yoke section, a set of free end edges defining in part a generally axial bore between said opposite end faces, and a pair of tip ends on each free end edge with the spacing between said tip ends being substantially greater than the width of said root section on each salient pole tooth.

30. The edgewise wound salient pole core as set forth in claim 29 further comprising a set of notches in said wound lanced strip arranged on the preselected pitch axes and extending in generally axial row formation across said yoke section between said opposite end faces so as to form in part said circumferential surface, respectively.

31. The edgewise wound salient pole core as set forth in claim 30 wherein said notches include a set of arcuate base walls, respectively, each base wall and free end edge arranged about a respective one of the preselected pitch axes having a common centerpoint.

32. The edgewise wound salient pole core as set forth in claim 31 wherein the common centerpoint is located on the respective one of the preselected pitch axes.

* * * * *

UNITED STATES PATENT AND TRADEMARK OFFICE
CERTIFICATE OF CORRECTION

PATENT NO. : 4,816,711
DATED : 03/28/89
INVENTOR(S) : HAROLD L. FRITZSCHE

It is certified that error appears in the above-identified patent and that said Letters Patent is hereby corrected as shown below:

On the first page, change the Assignee's name to

--General Electric Company--.

Signed and Sealed this

Sixteenth Day of January, 1990

*Attest:*

JEFFREY M. SAMUELS

*Attesting Officer*     *Acting Commissioner of Patents and Trademarks*